(12) United States Patent
Liu et al.

(10) Patent No.: US 9,201,525 B2
(45) Date of Patent: Dec. 1, 2015

(54) COMPUTER AND MOUSE CURSOR CONTROL METHOD

(71) Applicant: HON HAI PRECISION INDUSTRY CO., LTD., New Taipei (TW)

(72) Inventors: Ting-An Liu, New Taipei (TW); Chin-Shuang Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 13 days.

(21) Appl. No.: 14/192,882

(22) Filed: Feb. 28, 2014

(65) Prior Publication Data

US 2014/0247217 A1    Sep. 4, 2014

(30) Foreign Application Priority Data

Mar. 1, 2013  (TW) .............................. 102107147 A

(51) Int. Cl.
*G06F 3/0354* (2013.01)
*G06F 3/038* (2013.01)
*G06F 3/0488* (2013.01)

(52) U.S. Cl.
CPC ............ *G06F 3/03547* (2013.01); *G06F 3/038* (2013.01); *G06F 3/04883* (2013.01)

(58) Field of Classification Search
CPC ............ G06F 3/03547; G06F 3/04883; G06F 3/03545

See application file for complete search history.

(56) References Cited

U.S. PATENT DOCUMENTS

| | | | |
|---|---|---|---|
| 6,239,790 B1 * | 5/2001 | Martinelli et al. ............ | 345/174 |
| 8,549,443 B2 * | 10/2013 | Irvine ............................ | 715/863 |
| 9,030,429 B2 * | 5/2015 | Kwon et al. .................. | 345/173 |
| 2012/0127085 A1 * | 5/2012 | Stewart et al. ................ | 345/173 |

* cited by examiner

*Primary Examiner* — Abbas Abdulselam
(74) *Attorney, Agent, or Firm* — Novak Druce Connolly Bove + Quigg LLP

(57) ABSTRACT

A mouse cursor control method, applied in a computer, includes receiving a first pressing gesture and a second pressing gesture, when the first pressing gesture maintains and recognizes the first pressing gesture and the second pressing gesture as a function of a left mouse button or a right mouse button according to a position relationship between the first pressing gesture and the second pressing gesture.

10 Claims, 7 Drawing Sheets

COMPUTER AND MOUSE CURSOR CONTROL METHOD

BACKGROUND

1. Technical Field

The present disclosure generally relates to a computer and a mouse cursor control method applied in a computer.

2. Description of Related Art

Some electronic devices, such as notebook computers, are equipped with a touchpad for controlling a cursor. The touchpad performs many of the same scrolling and cursor positioning functions as a mouse. The touchpad includes two keys functioning as the left mouse button and the right mouse button of the mouse. However, there is room for improvement within the art.

BRIEF DESCRIPTION OF THE DRAWINGS

Many aspects of the embodiments can be better understood with parameters to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like parameters indicate similar elements. It should be noted that parameters to "an" or "one" embodiment in this disclosure are not necessarily to the same embodiment, and such parameters mean "at least one."

Figure 1:
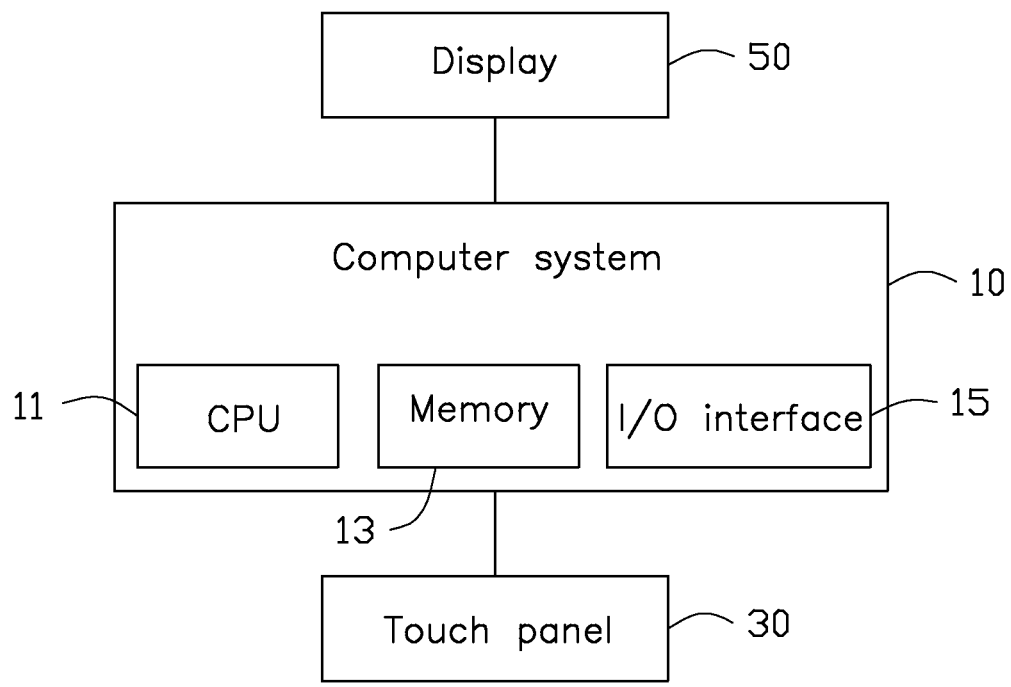
FIG. 1 is a block diagram of one embodiment of a computer.
Figure 2:
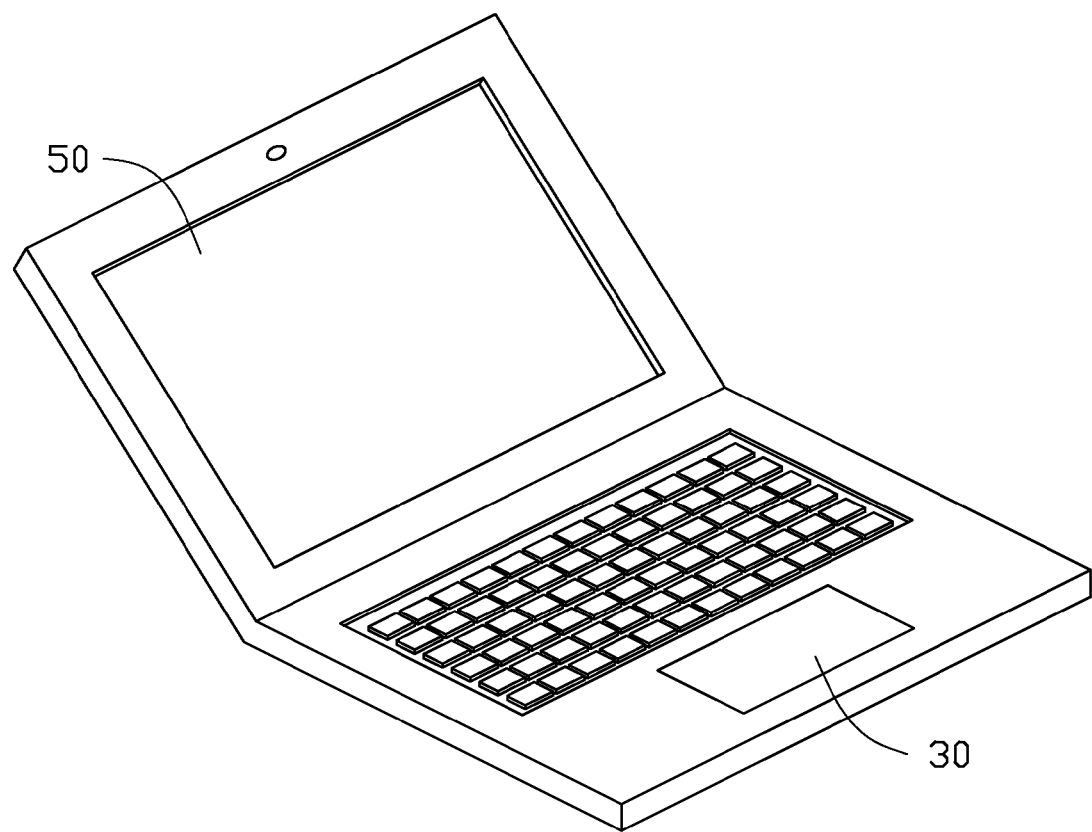
FIG. 2 is a schematic view of FIG. 1.

FIG. 1 shows an illustrated embodiment of a computer. The computer includes a computer system 10, a touch panel 30, and a display 50. The computer system 10 is connected to the touch panel 30 and the display 50. The computer system 10 includes a CPU 11, a memory 13, and an input interface 15. The computer system 10 controls a mouse cursor to click or drag icons FIG. 2 shows that the computer is notebook computer. The touch panel 30 is rectangular. In one embodiment, the touch panel 30 is made of carbon nanotube.

Figure 3:
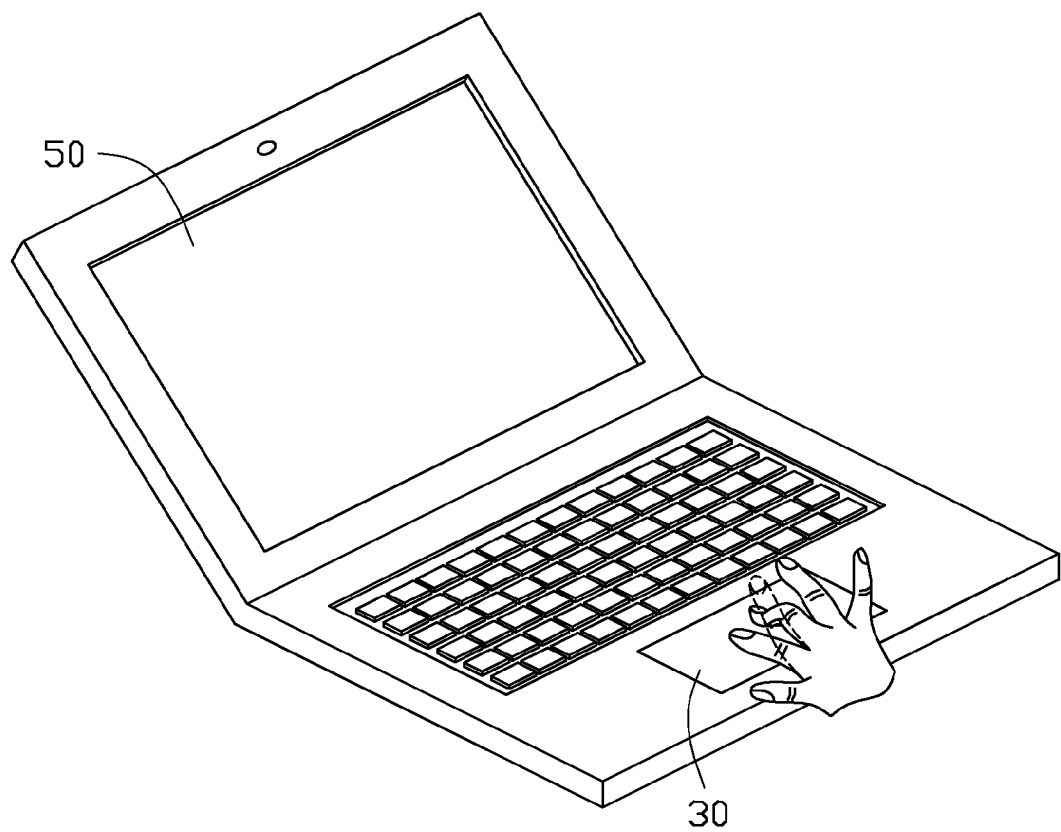
FIG. 3 is a first schematic view of FIG. 2, the touch panel is being operated.
Figure 4:
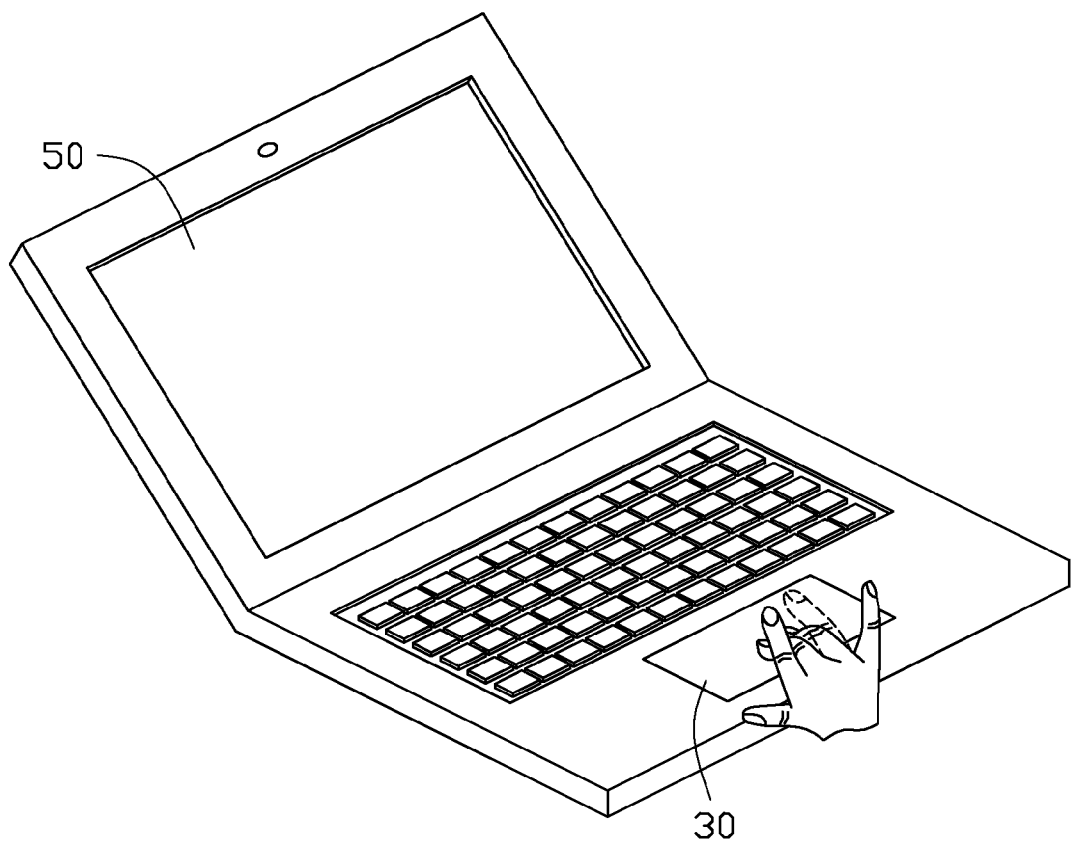
FIG. 4 is a second schematic view of FIG. 2.

The computer system 10 recognizes the gesture received by the touch panel 30 as left or right mouse button of a mouse. FIG. 3 shows that the middle finger presses the touch panel 30, and then the forefinger located on the left side presses the touch panel 30. The gesture is recognized as a function of the left mouse button. If the forefinger clicks the touch panel 30, the computer system 10 recognizes the gesture as the "click" function of the left mouse button. If the forefinger double clicks the touch panel 30, the computer system 10 recognizes the gesture as the "double click" function of the left mouse button. FIG. 4 shows that the middle finger presses the touch panel 30, and then the third finger on the right side of the middle finger presses the touch panel 30. The computer system 10 recognizes the gesture as the right mouse button. If the third finger clicks the touch panel 30, the computer system 10 recognizes the gesture as the "click" function of the right mouse button.

Figure 5:
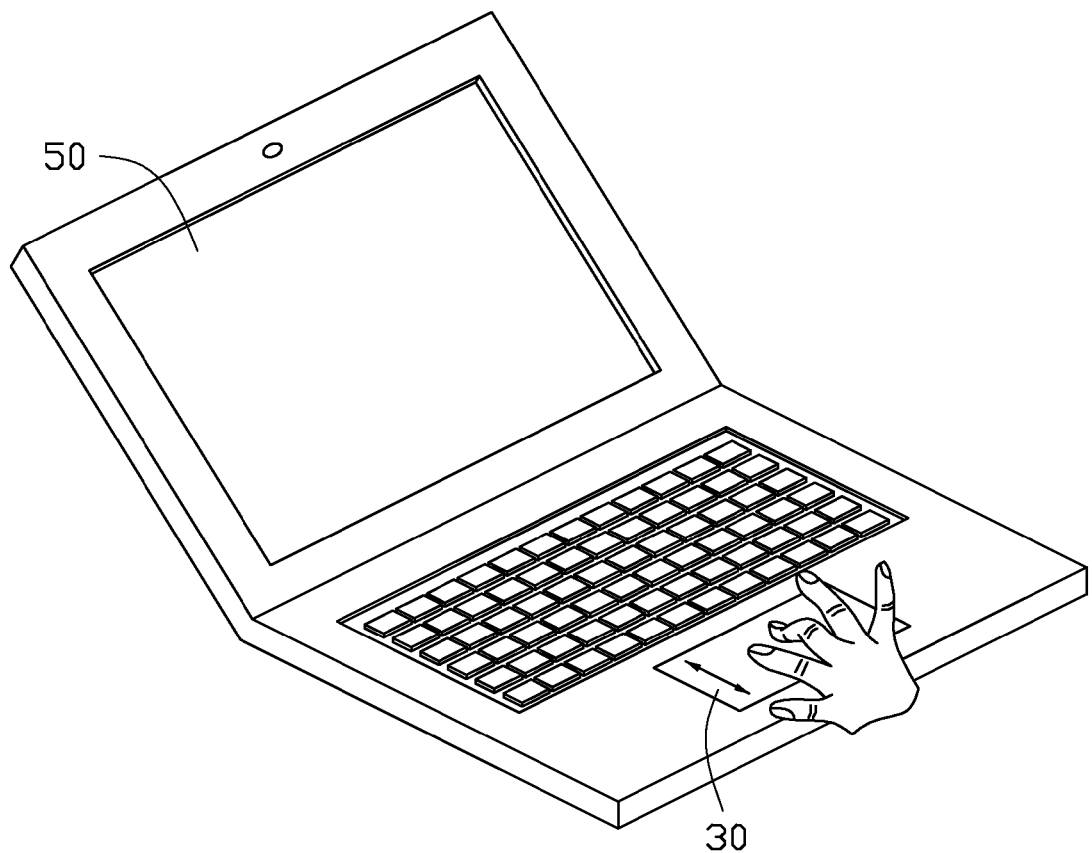
FIG. 5 is a third schematic view of FIG. 2.
Figure 6:
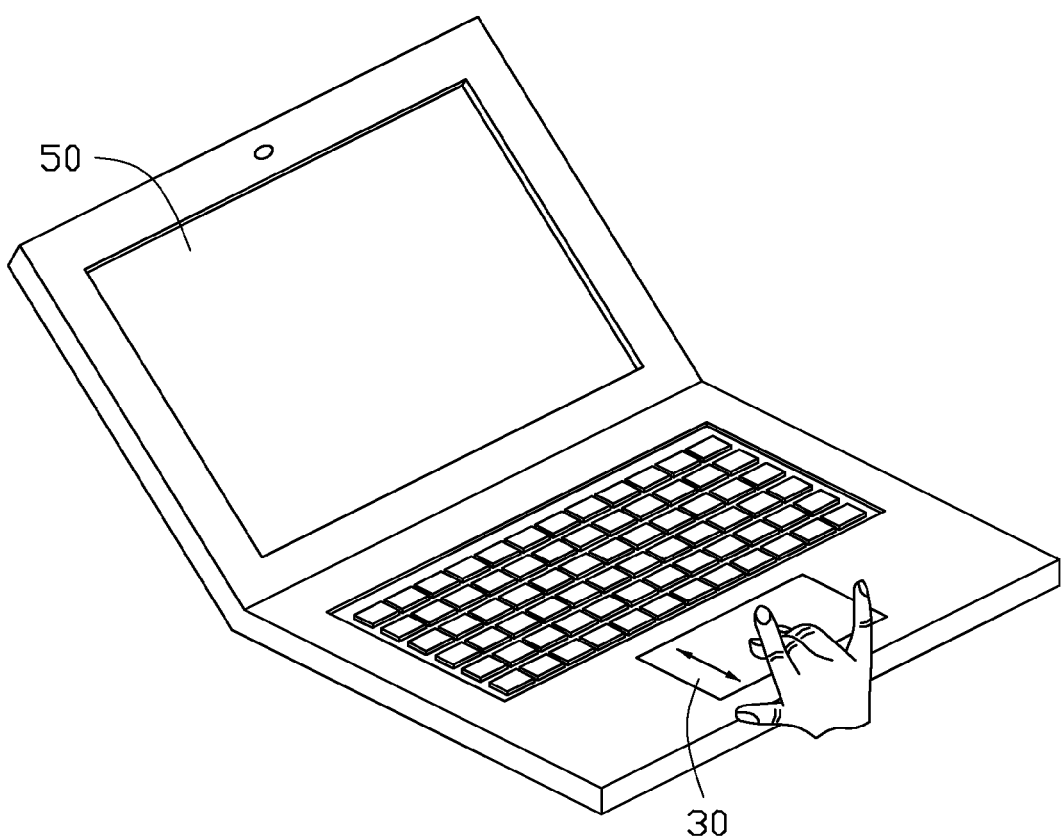
FIG. 6 is a fourth schematic view t of FIG. 2.

FIG. 5 shows that the middle finger presses the touch panel 30, and then the forefinger presses the touch panel 30. The computer system 10 recognizes the gesture as the left mouse button. The touch point of the forefinger and the touch point of the middle finger on the touch panel are defined to A and B. If the forefinger and the middle finger slide on the touch panel 30 from the touch points A and B along the same direction. The computer system 10 recognizes the gesture as the "drag" function of the left mouse button. FIG. 6 shows that the middle finger presses the touch panel 30, and the third finger presses the touch panel 30. The computer system 10 recognizes the gesture as the right mouse button. The touch point of the middle finger on the touch panel is defined to C. If the middle finger and third finger slide on the touch panel 30 from the touch points A and B along the same direction, the computer system 10 recognizes the gesture as the "drag" function of the right mouse button.

Figure 7:
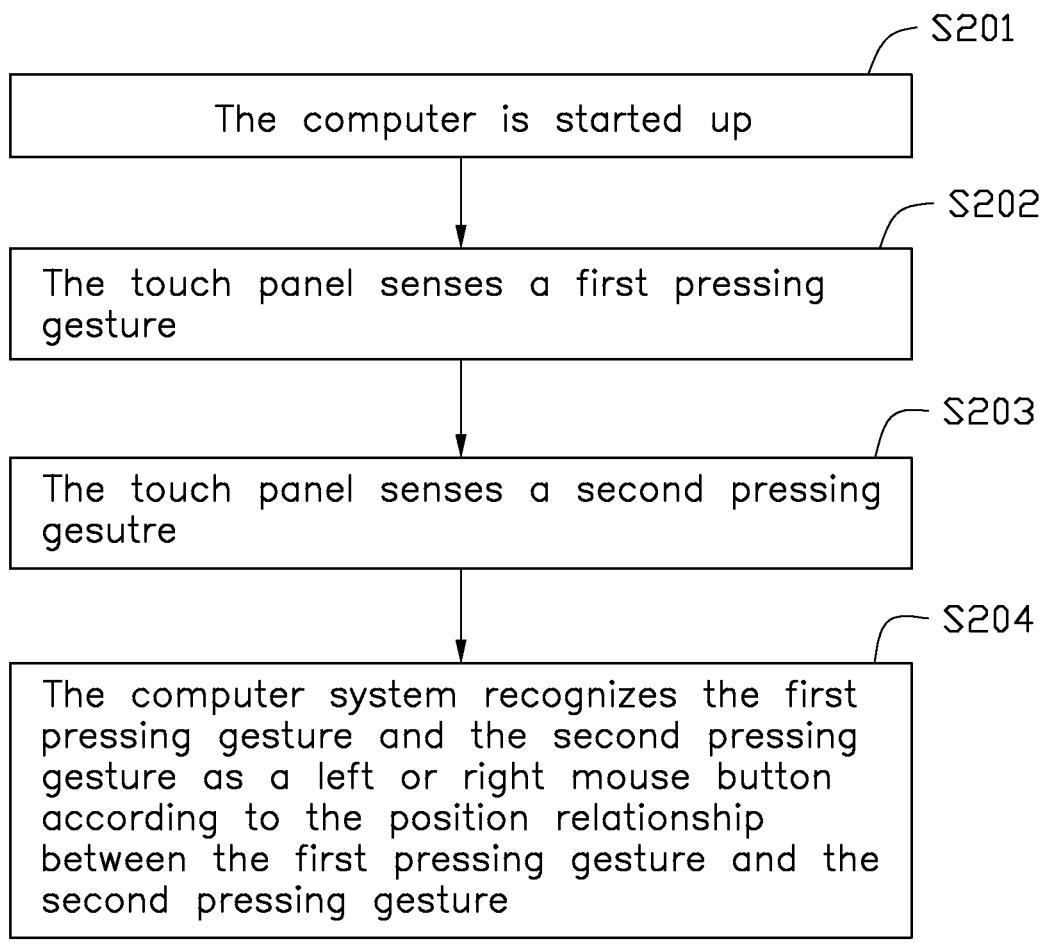
FIG. 7 is a flow chart of a mouse cursor control method of one embodiment.

FIG. 7 shows a mouse cursor control method of one embodiment including following steps.

In step S201, the computer is started up.

In step S202, the touch panel 30 senses a first pressing gesture, for example, the middle finger pressing the touch panel 30.

In step S203, the touch panel 30 senses a second pressing gesture when the first pressing gesture maintains.

In step S204, the computer system 10 recognizes the first pressing gesture and the second pressing gesture as the left mouse button or the right mouse button of the mouse according to the position relationship between the first pressing gesture and the second pressing gesture.

The mouse cursor control method includes functioning as "click", "double click", or "drag", shown in FIGS. 3 to 6.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A computer, comprising:
    a display, the display configured to display a mouse cursor;
    a touch panel, the touch panel configured to receive a first pressing gesture and to receive a second pressing gesture when the first pressing gesture maintains; and
    a computer system, the computer system configured to recognize the first pressing gesture and the second pressing gesture as a function of a left mouse button or a right mouse button according to a position relationship between the first pressing gesture and the second pressing gesture;
    wherein a first touch point is defined between the touch panel and the first pressing gesture and a second touch point is defined between the second pressing gesture and the touch panel; the computer system is configured to recognize two sliding gestures as a "drag" function of the left mouse button when the touch panel senses the two sliding gestures sliding from the first touch point and the second touch point along the same direction.

2. The computer of claim 1, wherein the computer system is configured to recognize the first pressing gesture and the second pressing gesture as a left mouse button when the first pressing gesture is located on a left side of the second pressing gesture.

3. The computer of claim 2, wherein the computer system is configured to recognize a "click" gesture as a "click" function of the left mouse button when the touch panel senses the first pressing gesture and the "click" gesture.

4. The computer of claim 2, wherein the computer system is configured to recognize a "double click" gesture as a "double click" function of the left mouse button when the touch panel senses the first pressing gesture and the "double click" gesture.

5. The computer of claim 1, wherein the touch panel is made of carbon nano tube.

6. A mouse cursor control method, applied in a computer, comprising:
   receiving, by a touch panel, a first pressing gesture and a second pressing gesture when the first pressing gesture maintains;
   recognizing, by a computer system, the first pressing gesture and the second pressing gesture as a function of a left mouse button or a right mouse button according to a position relationship between the first pressing gesture and the second pressing gesture, and
   recognizing two sliding gestures as a "drag" function of the left mouse button when the touch panel senses the two sliding gestures sliding from a first touch point and a second touch point along the same direction; wherein the first touch point is defined between the touch panel and the first pressing gesture and the second touch point is defined between the second pressing gesture and the touch panel.

7. The mouse cursor control method of claim 6, wherein recognizing, by the computer system, the first pressing gesture and the second pressing gesture as a left mouse button when the first pressing gesture is located on a left side of the second pressing gesture.

8. The mouse cursor control method of claim 7, wherein recognizing, by the computer system, a "click" gesture as a "click" function of the left mouse button when the touch panel senses the first pressing gesture and the "click" gesture.

9. The mouse cursor control method of claim 7, wherein recognizing, by the computer system, a "double click" gesture as a "double click" function of the left mouse button when the touch panel senses the first pressing gesture and the "double click" gesture.

10. The mouse cursor control method of claim 6, wherein the touch panel is made of carbon nano tube.

\* \* \* \* \*